United States Patent

Coliz et al.

[15] 3,643,066

[45] Feb. 15, 1972

[54] ARRANGEMENT FOR THE AUTOMATIC IDENTIFICATION OF INFORMATION ON A NONPERFORATED DATA PROCESSING CARD

[72] Inventors: James T. Coliz, New Providence; Robert R. Meola, Parsippany, both of N.J.

[73] Assignee: Calculagraph Company, East Hanover, N.J.

[22] Filed: Feb. 12, 1970

[21] Appl. No.: 10,758

[52] U.S. Cl. ....................235/61.11 E, 250/219 Q, 307/318

[51] Int. Cl. ................G06k 7/10, G01n 21/30, H03k 23/36

[58] Field of Search ................235/61.11, 61.11 D, 61.11 E; 307/318; 250/219

[56] References Cited

UNITED STATES PATENTS

| | | | |
|---|---|---|---|
| 3,486,040 | 12/1969 | McMillin | 307/318 |
| 2,268,498 | 12/1941 | Bryce | 235/61.11 E |
| 3,139,562 | 6/1964 | Freeborn | 307/318 |
| 3,231,787 | 1/1966 | Knudsen | 307/318 |
| 3,523,198 | 8/1970 | Keller | 307/318 |

*Primary Examiner*—Daryl W. Cook
*Attorney*—Rudolph J. Jurick

[57] ABSTRACT

A plurality of light beams are projected onto a light-permeable information storage element such as a data processing card which is coded by applying a substantially opaque coating to selected areas of the card surface. Photoconductive cells are positioned to receive light beams emerging from the card, each photocell forming part of a switching circuit which is actuated when the intensity of the light beam striking the photocell exceeds a predetermined level.

9 Claims, 4 Drawing Figures

JAMES T. COLIZ
ROBERT R. MEOLA
INVENTORS

BY

ATTORNEY

JAMES T. COLIZ
ROBERT R. MEOLA
INVENTORS

BY Rudolph J. Juick
ATTORNEY

ARRANGEMENT FOR THE AUTOMATIC IDENTIFICATION OF INFORMATION ON A NONPERFORATED DATA PROCESSING CARD

BACKGROUND OF THE INVENTION

It is the present practice to code cards and other information storage elements useful in data processing by prepunching the cards in predetermined areas, whereby a particular card will be identified by the card reader of data processing equipment. Standard data processing cards used for the recording of time have 80 vertical columns, each column comprising printed numerals from 0 to 9. Such cards are coded by prepunchings made in predetermined lines and columns thereof. One disadvantage of prepunched data cards lies in the fact that such cards require the use of special data processing equipment in order to prevent misinterpretation of the data punched in the card.

A card coding and photoelectric card reader made in accordance with this invention does not involve prepunching of the card and, therefore, eliminates the possibility of erroneous or ambiguous results when the coded cards are run through conventional data processing equipment.

SUMMARY OF THE INVENTION

The invention is directed to an arrangement for the automatic identification of coded information on a nonperforated data processing card. One or more darkened areas are formed on a surface of the card, within a reference zone, as by means of a substantially opaque ink. A plurality of light sources project light beams onto the card within the reference zone, the intensities of the light beams being sufficient to penetrate through nondarkened areas of the card. Photoconductive cells are positioned to receive the light beams emerging from the card, which photocells are connected in individual switching circuits including bistable multivibrators. An output signal is provided by the multivibrators when the intensity of the light beam striking the associated photoconductive cell exceeds a predetermined level. The output signals can then be introduced into any data processing or data recording system to assist in producing logical machine decisions.

An object of this invention is the provision of a photoelectric arrangement for the automatic detection of coded information on a nonperforated data processing card.

An object of this invention is the provision of a method of applying coded information on a data processing card without prepunching the card.

An object of this invention is the provision of a data processing card coded by means of substantially opaque coatings applied to preselected, discrete areas thereof, and a photoelectric reader providing output signals in response to light beams passing through noncoated areas of the card.

The above-stated and other objects and advantages of the invention will become apparent from the following description when taken with the accompanying drawings. It will be understood, however, that the drawings are for purposes of description and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENTS

Figure 1:
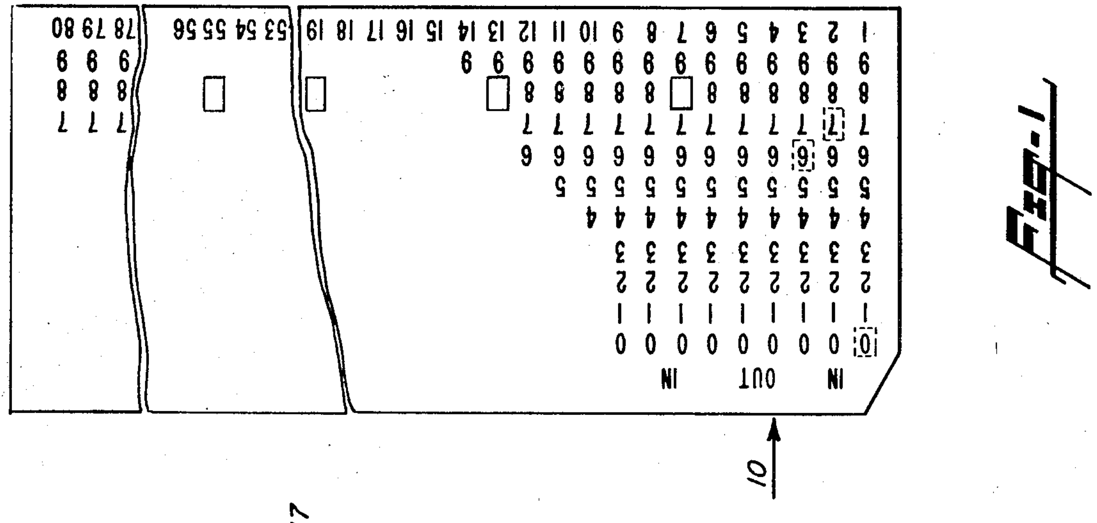
FIG. 1 is a plan view of a data card of the type used for punching time as a multiple digit time entry in adjacent columns of the card.

Reference now is made to FIG. 1 wherein there is shown a standard data processing card 10 having 80 vertical columns, each column consisting of 10 lines of the printed numerals 0, 1, 2-9. It will be assumed the card is used to record an employees arrival and departure times in military time. Upon the initial insertion of the card into a punching time recorder, the card will be punched in a first IN punching field consisting of the columns 1, 2 and 3. For example, if the card is punched in lines 0, 7 and 6, as indicated by the dotted line rectangles, the employee punched IN at 7:36 a.m. Monday morning. The next time entry will be punched in a second punching field consisting of the lines 4, 5 and 6, thereby providing a record of the time when the employee punched OUT for lunch or for the day. If IN and OUT punchings for the lunch period are not required, the recorder will punch two multiple digit time entries per day, or a total of 10 punchings for a normal, 5-day work week. On the other hand, if lunch period punchings are required, there will be four time punchings per day, or 20 punchings for the work week. In a large work force, the cards are coded in accordance with an employees assigned work shifts and lunch periods. Such coded information is read by a card reader forming part of the punching time recorder, whereby the card automatically is positioned relative to the punching mechanism so that the current time will be punched in the proper punching field. It is the present practice to code the cards by prepunching them in predetermined lines and columns thereof. For example, a card coded for a specific work shift and lunch period may be prepunched in line 8, ever 6th column, starting with column 7, as shown by the solid line rectangles. Other cards would be coded to identify other work shifts and lunch periods by prepunching the same columns but in another line or lines. Thus, if the prepunches are limited to, say, one or more of the lines 7, 8 and 9, the cards can be individually coded for six specific work shifts and lunch periods. At the end of the week, all of the cards are run through data processing equipment which calculates the total number of hours worked by each employee for the pay period. However, prepunched cards require special data processing equipment to preclude ambiguous results due to misinterpretation of the prepunched areas.

Figure 2:
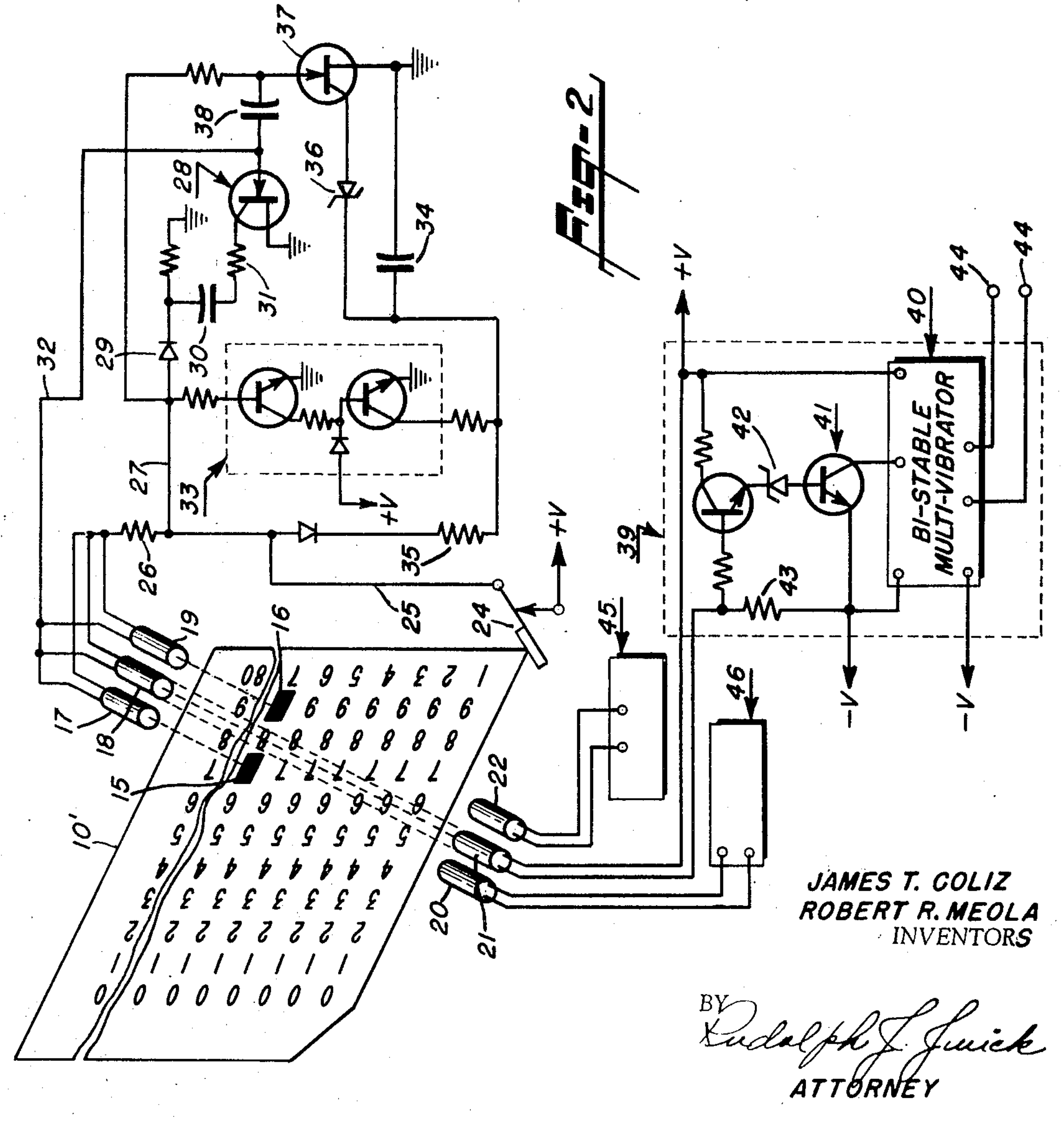
FIG. 2 shows a data card coded in accordance with one embodiment of this invention, together with the card reader circuitry.

Reference now is made to FIG. 2 showing a card 10' which is coded in accordance with this invention. In this case, lines 7 and 9, in column 7, are overprinted with an opaque ink, as indicated by the solid rectangles 15 and 16, respectively. Although not shown in the drawing, lines 7 and 9 are similarly overprinted in columns 13, 19, etc., whereby the coding of the card 10' corresponds to that of the prepunched card shown in FIG. 1. Assuming that only three lines are used for the coding of the cards, the card reader comprises the three light sources 17–19 and the three photoconductive cells 20–22 aligned therewith. Each light source projects a beam of light, preferably of circular cross section, onto the card and the intensity of each light beam is such that the light energy passing through the particular card results in a predetermined change in the ohmic resistance of the associated photocell.

Upon the insertion of the card into a punching time recorder, the card first is positioned, either manually or automatically, in an initial reference position after which it is displaced in a step-by-step manner with reference to the punches, all for the purpose of punching the multiple digit time entry in proper columns of the card. The light sources and photocells are positioned so that they are aligned with card column carrying the code marking, or markings, when the card is in the initial reference position, as illustrated. Upon reaching the initial reference position, the card effects the closure of a normally open switch 24, thereby energizing the light sources for a time period sufficient for the card reader to react to the coded information on the card, which time period terminates before the step-by-step displacement of the card for the punching operation. The closure of the switch 24 applies a + voltage on the lead 25, which lead is connected to one terminal of each of the light sources through a current limiting resistor 26. The + voltage now appearing on the lead 27 fires the silicon controlled rectifier 28 through the diode 29, capacitor 30 and resistor 31, thereby connecting the lead 32 to ground and resulting in the energization of the three light sources. The + voltage on the lead 27 also opens the transistor gate 33. At the same time, the capacitor 34 starts to charge through the resistor 35 and when the voltage across the capacitor reaches the breakdown voltage of the zener diode 36, the silicon controlled rectifier 37 is fired, thereby resetting the rectifier 28 through the capacitor 38. This opens the ground connection to the lead 32 thereby deenergizing the light source 17–19. The punching time recorder is arranged so that the card is displaced, in the step-by-step manner, for the punching thereof, upon deenergization of the light sources, such displacement of the card resulting in the opening of the switch 24. Upon the removal of the + voltage from the lead 25, the capacitor 34 discharges through the now closed transistor gate 33 and, also, the rectifier 37 is reset.

As shown in FIG. 2, the photoconductive cell 21 is connected to a switching circuit 39 which includes a bistable multivibrator 40 arranged to change its state when the transistor 41 is switched on, which action takes place when the zener diode 42 has sufficient voltage across its terminals to initiate conduction. The voltage level across this diode is determined by the voltage drop across the resistor 43. Thus, the voltage divider action of the photocell 21 and the resistor 43, combined with the conduction voltage of the diode, determine the circuit conditions which will cause a change of state of the multivibrator. When insufficient light passes through the card the ohmic resistance of the photocell 21 is high and the voltage drop across the resistor 43 will be too low to operate the zener diode. Under this condition, the transistor 41 will not turn on and the multivibrator will not change its state. However, when sufficient light energy strikes the photocell 21, its resistance is lowered and the voltage drop across the resistor 43 is raised to operate the diode, whereby the transistor is turned on and the multivibrator will change its state to produce a signal at its output terminals 44. Such output signal, in the application under discussion, is utilized to actuate appropriate mechanism in the punching time recorder for displacing the card in a step-by-step manner with respect to the punches. However, those skilled in this art will understand that the output signal from the multivibrator can be introduced into any data processing system or data recording system to provide logical machine decisions in correspondence with the coding of the particular card. The photoconductive cells 20 and 22 are individually connected to similar circuits, which circuits are identified by the blocks 45 and 46, respectively, in the drawing. In the illustrated arrangement, during the brief period when the light sources are energized, only light from the source 18 passes through the card, thereby producing an output signal from the associated multivibrator 40. The light from the other two light sources is blocked by the opaque coatings applied over the lines 7 and 9, thereby preventing a change of state of the multivibrators associated with the photocells 20 and 22.

The opaque coating is applied over the printed numerals in predetermined lines of the card, the area of each coating being somewhat larger than that occupied by the numeral. Thus, for example, if the card of FIG. 1 is coded by prepunches made in lines 7 and 9 thereof, the equivalent coding of the card 10', FIG. 2, requires the application of the opaque coating only over the line 8. The opaque coatings applied to the card do not interfere with the normal punching of the card, it being apparent, for example, that the punch will pass through the card and the coated area 16 when a 9 digit of the time entry is to be punched in column 7. The absence of prepunches in the card eliminates the possibility of misinterpretation of the punched data by conventional data processing equipment. Furthermore, there is no restriction upon the number of card lines which can be used for card coding purposes. In fact, the card reader may comprise a row of 10 light sources associated with a row of ten photocells, whereby all 10 card lines, or combination thereof, are available for coding of the cards. In cases wherein more than a single line is used for coding the card, the recognition of such card by the card reader requires only an appropriate combination of the outputs of the multivibrators associated with those photocells which are illuminated by light emerging from the noncoated areas of the card.

The data cards illustrated in FIGS. 1 and 2 are specifically adapted for the recording of time by means of punchings made in adjacent card columns. However, it will be apparent that the described card coding system and card reader have general utility in the field of data recording and processing. Various combinations of coated and noncoated areas can be formed on a surface of the card within a predetermined reference zone, which reference zone corresponds to the location of the light sources and photocells of the particular card reader. Also, the coated areas of the card may have any desired geometrical configuration and color, the only requirement being that the darkened areas of the card provide a significant reduction in the intensity of the light beam emerging from the card as compared to that which passes through a nondarkened area. Preferably, the darkened areas of the card are black and each such area is somewhat greater than the area of the corresponding light beam, thereby to provide substantially complete cutoff of the light beam and minimize the possibility of error in the recognition of the particular card by the photoelectric card reader.

Figures 3, 4:
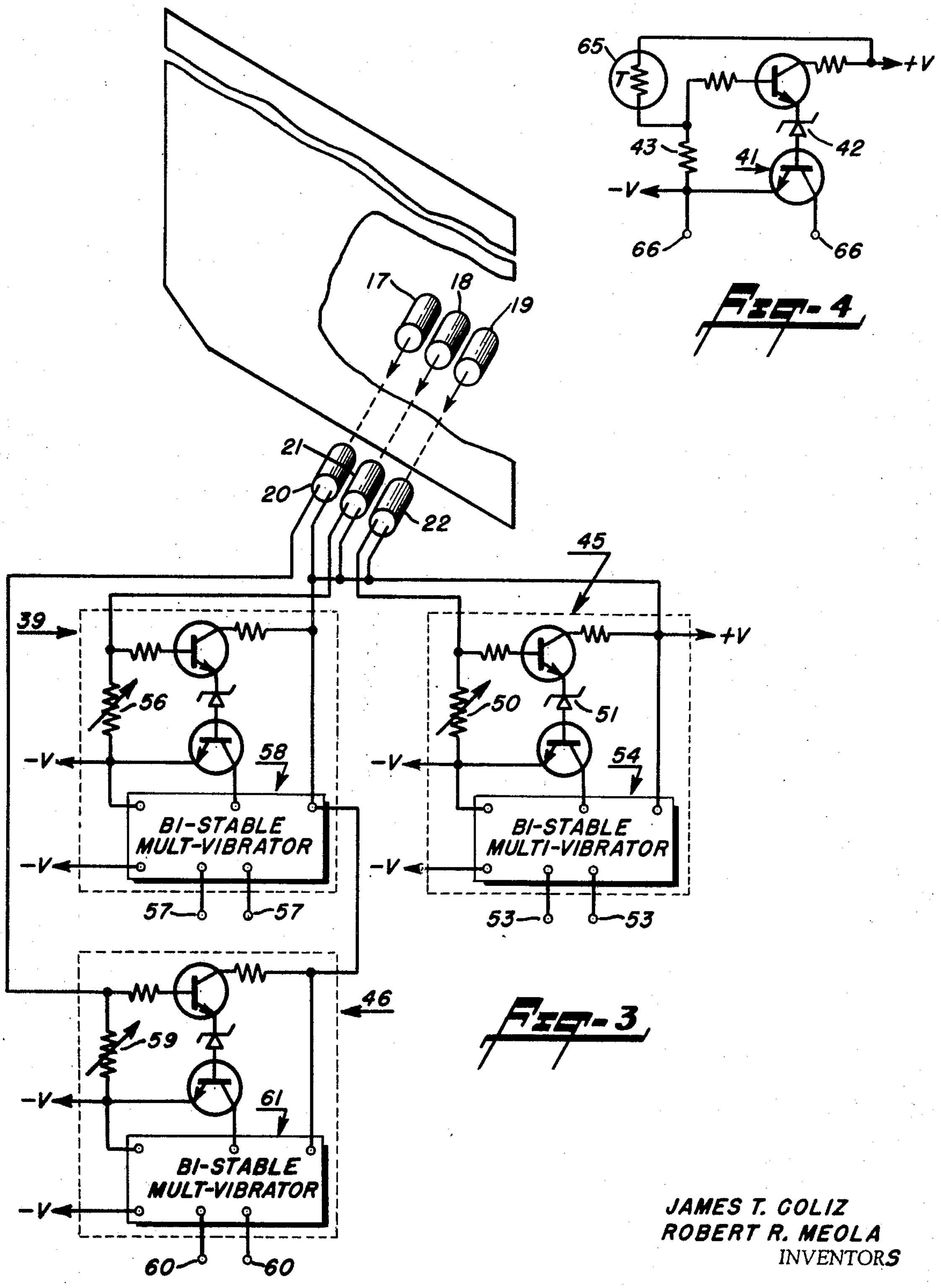
FIG. 3 shows a modification of the card reader for the recognition of cards on the basis of color.
FIG. 4 is a circuit diagram of the switching circuit arranged to provide an output signal in response to an input voltage developed by a thermistor.

The described card reader is adapted for the recognition of cards on the basis of color without requiring the use of light filters and amplifiers. FIG. 3 shows the three light sources 17–19 aligned with the photoconductive cells 20–22, each photocell being connected in the circuits identified by the numerals 46, 39 and 45, respectively. Assuming the card reader is to detect the presence of white, red and blue cards, the three circuits are adjusted to operate as follows. With the light sources energized, a blue card is positioned in the light beams and the resistor 50 is adjusted to cause conduction of the zener diode 51, thereby producing a signal at the output terminals 53 of the multivibrator 54. The blue card is replaced by a red card and the value of the resistor 56 is adjusted to produce a signal at the output terminals 57 of the multivibrator 58. Finally the resistor 59 is adjusted to provide a signal at the output terminals 60 of the multivibrator 61 when the white card is positioned in the light beams. Thus, the three circuits are adjusted for response to light intensities having three, different minimum levels. Thereafter, when a white card is positioned in the card reader, output signals will appear at the three sets of output terminals 53, 57 and 60. When a red card is inserted into the reader, output signals will appear only at the two sets of output terminals 57 and 53 and the blue card will result in an output signal appearing only at the output terminals 53. These output signals can be introduced into any data processing system for the automatic identification of a card having a particular color.

It will also be apparent that the switching circuit 39, shown in FIG. 2, need not include the multivibrator 40. When the voltage drop across the resistor 43 exceeds the breakdown voltage of the zener diode 42, the transistor 41 switches from the nonconducting to the conducting state, whereby an output voltage change appears across the emitter and collector of this transistor. Such output voltage change may be utilized for the actuation of any appropriate device. Also, this switching circuit is not limited for use with a photoconductive cell as illustrated. The circuit may be used in conjunction with any transducer providing a voltage change in response to changes in a condition. More specifically, and as shown in FIG. 4, a thermistor 65 is connected between one side of the voltage source and the resistor 43. When the resistance of the thermistor falls below a predetermined ohmic value, due to a temperature change, the voltage drop across the resistor 43 will cause the zener diode 42 to conduct and a voltage change will appear across the output terminals 66.

Having now described the invention what we desire to protect by Letters Patent is set forth in the following claims.

1. In combination, a. An information storage element, b. means forming nonperforated discrete areas on the element within a reference zone, said areas having different light transmitting characteristics, c. means projecting light onto the said element within said reference zone, d. photosensitive means positioned to receive light emerging from the element, e. a first resistor connected in series with the photosensitive means and across a voltage source, f. a first transistor having its base connected through a second resistor to the common junction of said photosensitive means and the first transistor, said first transistor having its collector connected through a third resistor to one side of the voltage source, g. a zener diode having one terminal connected to the emitter of said first resistor, h. a second transistor having its base connected to the other terminal of the zener diode and its emitter connected to the other side of the voltage source, and i. a bistable multivibrator having its input circuit connected to the emitter and collector of the second transistor, said multivibrator changing state when the voltage across the said first transistor exceeds a predetermined magnitude.

2. The invention as recited in claim 1, wherein the light projected onto the element comprises a plurality of individual light beams, and wherein the said photosensitive means comprises a plurality of photoconductive cells.

3. The invention as recited in claim 2, wherein the light beams are circular and of equal cross-sectional area, and wherein the discrete areas formed on the said element each have an area exceeding that of the light beams.

4. The invention as recited in claim 1, wherein the said discrete areas are of different colors.

5. The invention as recited in claim 1, wherein at least one of said discrete areas comprises a substantially opaque coating applied to a surface of the said element.

6. The invention as recited in claim 5, wherein the said information storage element is a data processing card; wherein the said card has formed thereon a plurality of columns, each column being defined by a row of printed numerals; and wherein the said coating overlies one or more of the numerals in one card column.

7. A photoelectric card reader comprising, a. means producing a light beam, b. a photoconductive cell receiving light passing through the card when the card is positioned in the light beam, c. a first resistor connected across a voltage source in series with the photoconductive cell, d. a first transistor having its base connected through a second resistor to the common junction of the photoconductive cell and first resistor, said transistor having its collector connected through a third resistor to one side of the voltage source, e. a zener diode having one terminal connected to the emitter of said first transistor, f. a second transistor having its base connected to the other terminal of the zener diode, and g. a bistable multivibrator having its input circuit connected to the emitter and collector of said second transistor, said multivibrator changing state when the voltage across the said first resistor exceeds a predetermined magnitude.

8. A switching circuit comprising, a. a first transistor having its collector connected through a resistor to one side of a voltage source, b. a zener diode having one terminal connected to the emitter of said transistor, c. a second transistor having its base connected to the other terminal of the zener diode and its emitter connected to the other side of the voltage source, and d. means applying a switching voltage across the base of said first transistor and the said other side of the voltage source, said second transistor switching to the conducting state when the magnitude of said switching voltage exceeds the breakdown voltage of said zener diode.

9. The invention as recited in claim 8, including a photoconductive cell connected in series with a second resistance and across the said voltage source, and means connecting the junction point of said photoconductive cell and second resistor to the base of said first transistor through a third resistor, the voltage drop across the said second resistor constituting the switching voltage.

* * * * *